United States Patent
Di Cera Colazingari

(10) Patent No.: US 9,655,074 B2
(45) Date of Patent: May 16, 2017

(54) TAGLESS RADIO FREQUENCY BASED SELF CORRECTING DISTRIBUTED REAL TIME LOCATION SYSTEM

(75) Inventor: Roberto Ugo Di Cera Colazingari, Oporto (PT)

(73) Assignee: MOVVO, S.A., Oporto (PT)

( * ) Notice: Subject to any disclaimer, the term of this patent is extended or adjusted under 35 U.S.C. 154(b) by 1075 days.

(21) Appl. No.: 13/820,433

(22) PCT Filed: Sep. 1, 2011

(86) PCT No.: PCT/PT2011/000028
§ 371 (c)(1),
(2), (4) Date: May 3, 2013

(87) PCT Pub. No.: WO2012/091591
PCT Pub. Date: Jul. 5, 2012

(65) Prior Publication Data
US 2013/0231131 A1    Sep. 5, 2013

Related U.S. Application Data

(60) Provisional application No. 61/378,936, filed on Sep. 1, 2010.

(51) Int. Cl.
*H04W 24/00* (2009.01)
*H04W 64/00* (2009.01)
*G01S 5/02* (2010.01)

(52) U.S. Cl.
CPC ............. *H04W 64/00* (2013.01); *G01S 5/02* (2013.01); *G01S 5/021* (2013.01)

(58) Field of Classification Search
CPC .................................................. H04W 64/00
(Continued)

(56) References Cited

U.S. PATENT DOCUMENTS

2001/0044309 A1   11/2001   Bar et al.
2002/0135516 A1*   9/2002   Sollenberger ............. G01S 5/02
                                                      342/387
(Continued)

OTHER PUBLICATIONS

Notification of Transmittal of the International Search Report and the Written Opinion of the International Searching Authority, or the Declaration, including an International Search Report and Written Opinion of the International Searching Authority, mailed Feb. 22, 2012 in connection with PCT International Application No. PCT/PT2011/000028, filed Sep. 1, 2011.

*Primary Examiner* — Marcus Hammonds
(74) *Attorney, Agent, or Firm* — John P. White; Gary J. Gershik; Cooper & Dunham LLP

(57) ABSTRACT

Services based on radio frequencies like GPS, RFID, GSM, CDMA, Wi-Fi or Bluetooth triangulation allows us to know, with some level of confidence, the position of a mobile device. However, those methods rely on special software and/or hardware. They also fail inside buildings since they cannot provide fine granulated values with a high level of accuracy. Each radio frequency device (mobile or not) emits a signal with a given strength and identification (Mac address or similar) to the air. The signal is captured by our nodes (at least 2 of the nodes), that measures the strength of the signal and therefore calculate the distance estimation. Since the signal is affected by electromagnetic noise, number of people in the building, or even temperature, the suggested system self corrects the values by knowing the distance between the nodes and measuring the signal strength. This gives to the system a very low error margin of about 1%. Some applications rely on real time tracking solutions, that traditional tracking systems cannot provide or need to provide tags to follow devices. The system here presented is distributed to be able to process the signal in real time (connected via a high speed network), with low (Continued)

latency and also stores the location estimation, device identification and time collected for analytics and reporting.

7 Claims, 5 Drawing Sheets

(58) Field of Classification Search
USPC .............................................. 455/456.1–457
See application file for complete search history.

(56) References Cited

U.S. PATENT DOCUMENTS

| | | |
|---|---|---|
| 2004/0087317 A1 | 5/2004 | Caci |
| 2004/0214565 A1* | 10/2004 | Shinmei .................. H04W 4/02 455/423 |
| 2005/0048990 A1* | 3/2005 | Lauriol ................ H04W 64/00 455/456.1 |
| 2006/0009235 A1* | 1/2006 | Sheynblat ............. G01S 5/0036 455/456.1 |
| 2008/0303901 A1* | 12/2008 | Variyath .................. G01S 5/02 348/143 |

* cited by examiner

TAGLESS RADIO FREQUENCY BASED SELF CORRECTING DISTRIBUTED REAL TIME LOCATION SYSTEM

CROSS-REFERENCE TO RELATED APPLICATIONS

This application is a §371 national stage of PCT International Application No. PCT/PT2011/000028, filed Sep. 1, 2011, claiming the benefit of U.S. Provisional Application No. 61/378,936, filed Sep. 1, 2010, the contents of each of which are hereby incorporated by reference in its entirety.

FIELD OF INVENTION

This invention relates to a distributed system that receives radio frequency from devices (mobile or not) and is able to calculate the distance with a low error level (1%) and in real time. The system uses a distributed architecture to be able to process location data so it can provide tracking information in real time.

The system can be used to track devices in a given location or in multiple geographically dispersed locations, since the system aggregates data from multiple locations.

BACKGROUND OF THE INVENTION

The current state of art in real time location systems always depend on tags (special hardware or software given to be installed) to track devices movements in a given area. There are also some systems that discreetly monitor movements of mobile communication devices. All those system return location estimation, without concerning about the error margin and the speed of the data retrieved. Most systems are used to process data asynchronously or batch processed in some previously determinated instant of time. None of the systems invented until this day use a distributed computer system to calculate the localization data or to be able to have a centralized tracking system.

This centralized tracking system is useful for people that want to be able to track several spaces, since all data is shown in real time and from different locations. This system allows people to track their spaces even if they are geographically scattered, using an Internet connection to access the main server.

In conclusion, to the date there is no tracking system that is able to return in real time with a very low error margin (1%), without the use of any special hardware or software installed in the device. This system is useful to several scenarios, from traffic management to retail customers flow analysis, and since it's in real time it can be used to control robots retrieving their location.

Previously submitted US patent application (US 61/378, 936) was based only on Bluetooth radiofrequency communication to address to this problems, proposing a self correcting Bluetooth system. From further research, this actual submission addresses the problem to all kind of radio frequency, by analysing the full spectrum for data.

SUMMARY OF THE INVENTION

The invention consists on a distributed system containing: Multiple of three detecting nodes, or in the worst case only 2 nodes, evenly distributed over a given area. That area may be an open field or a building. Each node is responsible for passively detect the radio frequencies emitted and their strength. That data is forwarded to a local server. Each node is always communicating with the nearby neighbour nodes to calibrate the signal, calculating the spectrum noise, based on the known distance between nodes. This action is called calibration.

Each node connects to the local server via a local network. The nodes act as the passive receiver and on some occasions can act as local server (in case of local server failure) or as a buffer (in case of network problems), in order to preserve system integrity and backup system data.

One local server acts as the local authority to timestamp the data obtained by the nodes and calculate the local estimative of the device detected. The local server calculates the triangulation estimative using the nodes data and nodes calibration data. All tracking data is then immediately sent to the main server.

One or more main servers are responsible to manage, store and show the data received from the local server. The main server is the responsible to distribute tasks to the local nodes to calculate tracking statistics and analytics. When all that data is calculated it is shown by the main server based on the requests by the end users.

To evenly distribute task over main servers and to achieve real time processing, it is used a round robin approach. Each radio frequency device is identified based on a single identification (may be Mac address or similar).

The local server and main server or main servers are defined as middleware, since they are the responsible for process the location, process business rules, management and display events and reports.

The method of the invention and system allows to track radio frequency devices in a limited area covered by the nodes, with a very low error rate (1%), regardless the radio frequency interferences. All devices are tracked based only on the signals emitted by the devices, being the nodes completely passive, only communicating with the local server and with each other for calibration purposes.

All communication is done using a high speed network. For high speed network we refer to a network connection of at least 100 Mbps.

Embodiments of the invention will be described by way of example, with reference to the attached drawings.

(1a), (1b), (1c), (1aa) represents an example of radio frequency devices.

(2a), (2b), (2c), (2aa), (2bb), (2cc), (2aaa), (2bbb), (2ccc), (2ddd), (2eee), (2fff) represents nodes responsible to detect the radio frequency.

(3a), (3b), (3c) represents a local server.

(4a), (4b), (4c) represents main servers.

(5a), (5b) represents clients.

Figure 5:
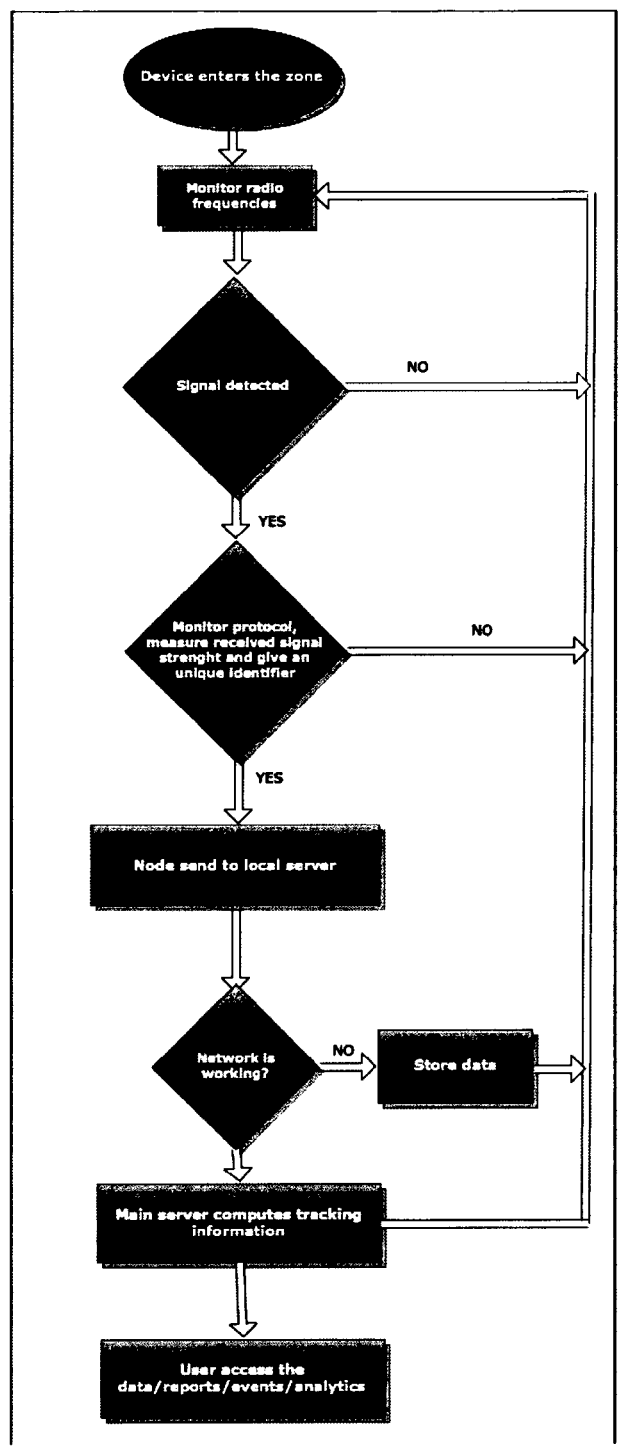

FIG. 5): Diagram of how the system behaves when it detects a device and all the process of data processing.

DETAILED DESCRIPTION OF THE EMBODIMENTS OF THE INVENTION

The system invention is composed by three elements:
the nodes (at least 2 nodes may be installed)
the local server(s) (at least one local server)
the main serve(s) (at least one main server)

The nodes are constituted by a computer system with a software radio to analyse the radio frequencies spectrum and custom made operative system.

The local and main server is a computer system with a custom made network operative system.

The system is interconnected using a network connection of at least 100 Mbps, that can be one of those: cabled or wireless.

The main server or main servers that belong to the system can be connected using an Internet connection, shared private connection or private network built for that purpose only.

The system may be deployed in several scenarios, from open spaces to buildings or underground locations. The location area can be of unlimited size, as long we install nodes and network that cover that area.

Some applications, such as security survey, robot controlling or traffic management require a low latency, real time and precise location of a device. This invention tackles the problem by detecting the radio frequency of the device and retrieving an unique identifier for that device based on the signal sent. That signal has an associated strength that is prone to interference, atmospheric conditions and/or other causes.

By knowing the precise measurement of the distance between the nodes, it is possible to the local server to correct the received values based on the calibration data.

Each 30 seconds, the nodes communicate between them, sending calibration packets over a Wi-Fi connection. The received signal strength is then sent to the local server with the receiver and sent node information.

The exact position of the device is calculated based on the data collected and by the nodes calibration data most recently received. Once the location data is corrected it is stored in the main server.

The main server is the responsible for processing the data and also for applying business rules, calculating location analytics, detecting events and triggering reports.

People may access that data using clients that connect to the main server using an Internet connection.

In order to optimize the calculations, there is always a main server that is responsible for the distribution of the processing tasks in a round robin method between other main servers in the datacentre. Therefore the data load is processed in real time. Basically the main server load balances the tasks in order to provide always a fast response.

The local server and main server (or main servers) are designated as middleware, since they depend on each other. In the case of a network failure, the nodes and local servers act as a buffer, accumulating data until a network is available. When a network is available again, all buffered data is sent to be processed.

For extreme precision deployments the main server also measures the network latency so it can optimize the location data calculations to provide the most accurate values.

Figure 1:
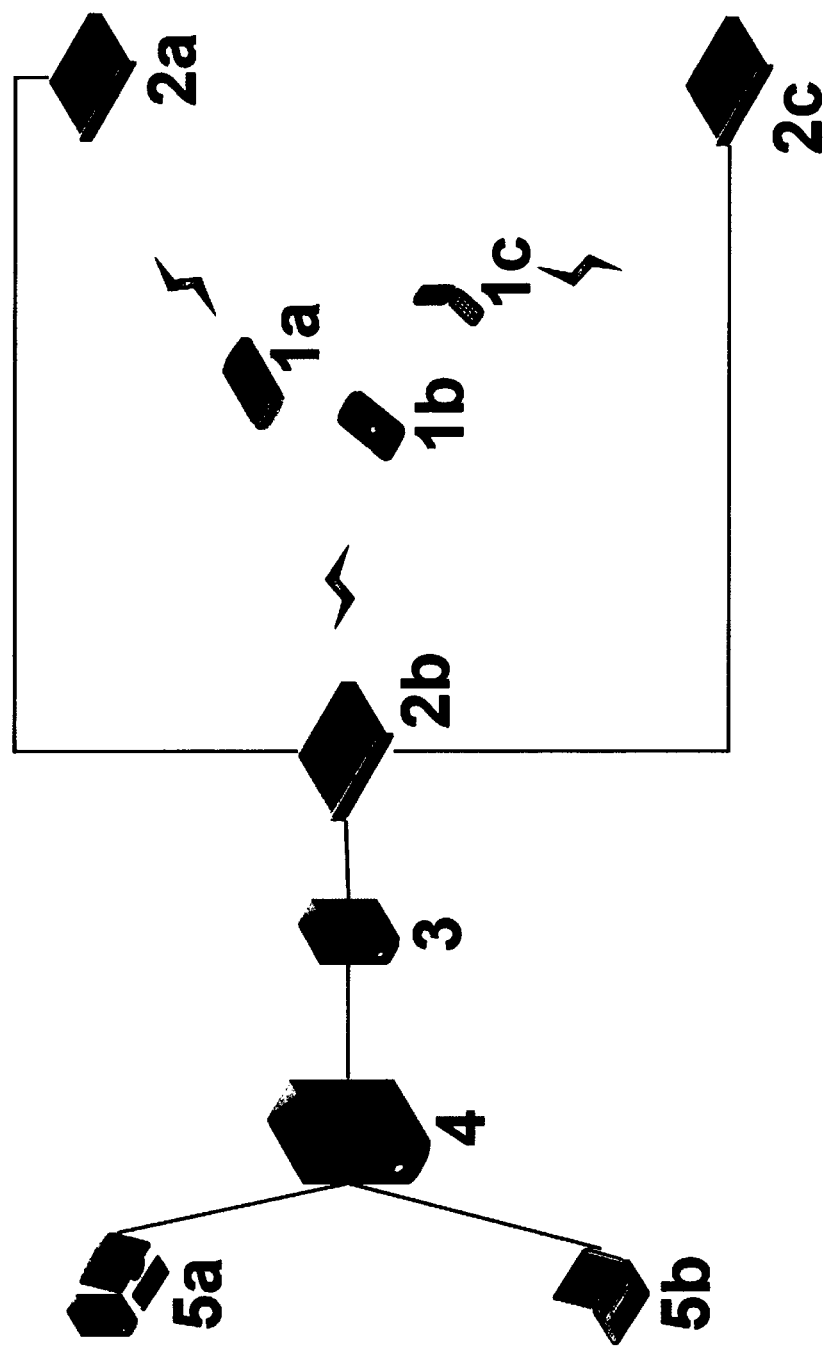
FIG. 1: Schematic diagram of one embodiment of the system based on the invention specifications, deployed in one location, where:
- (1a), (1b), (1c) represents an example of radio frequency devices.
- (2a), (2b), (2c) represents nodes responsible for the detection of the radio frequency.
- (3) represents a local server.
- (4) represents a main server.
- (5a), (5b) represents clients.
Figure 2:
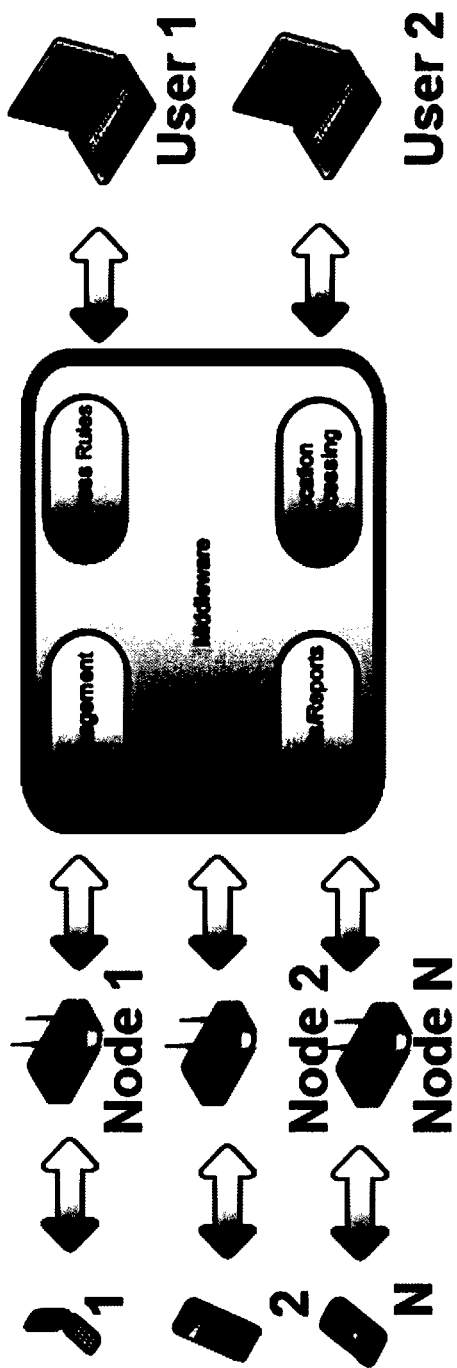
FIG. 2): Schematic diagram of the system middleware and access by the end users. The middleware is composed by the local server and main server (or several main servers).
Figure 3:
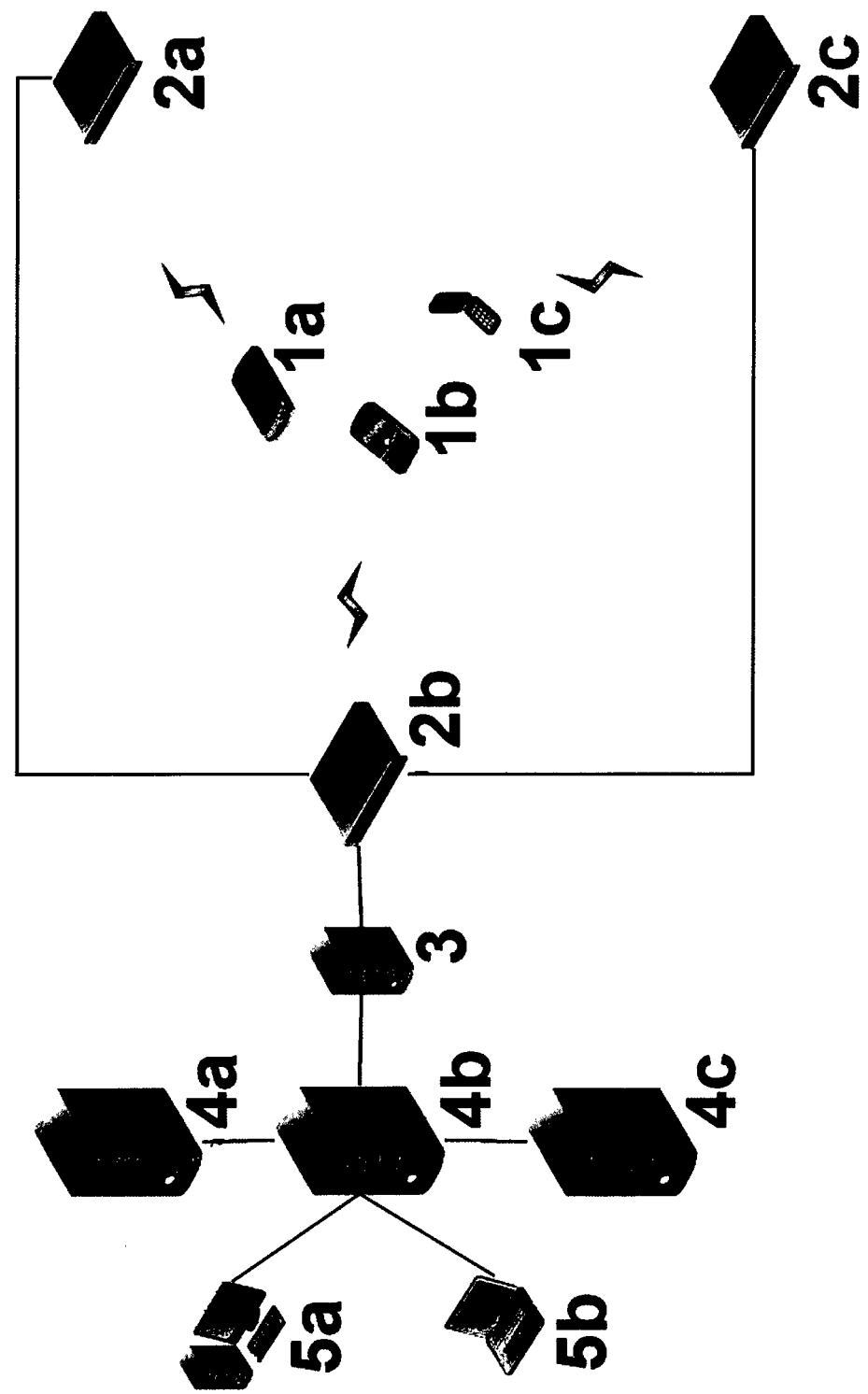
FIG. 3): Schematic diagram of the system using more than one main server to distribute the load to deliver real time analytics.
- (1a), (1b), (1c) represents an example of radio frequency devices.
- (2a), (2b), (2c) represents nodes responsible for the detection of the radio frequency.
- (3) represents a local server.
- (4a), (4b), (4c) represents main servers.
- (5a), (5b) represents clients.

In order to demonstrate how the system works, based on FIG. 1:

A device (1a, 1b or 1c) enters the zone; the nodes detect some emission from the device (2a, 2b, 2c); based on the protocol, the node discovers a unique identifier;

Each 30 seconds the nodes communicate between them to read the signal strength based on Wi-Fi communication (2a, 2b, 3c);

The data collected is immediately sent to the local server (3);

The local server creates a timestamp of that data and calculates the location based on at least:
three reading from three nodes;
one calibration reading;

The local, server stores the location data and timestamp and forwards it to the main server (4);

The main server then processes the location data and stores it;

The main server computes or delegates the computation to other main server and creates analytics based on the data collected;

The user may access the processed data using an Internet connection. The data is displayed in text or in graphics, based on user request and also the rules stored on the server.

Figure 4:
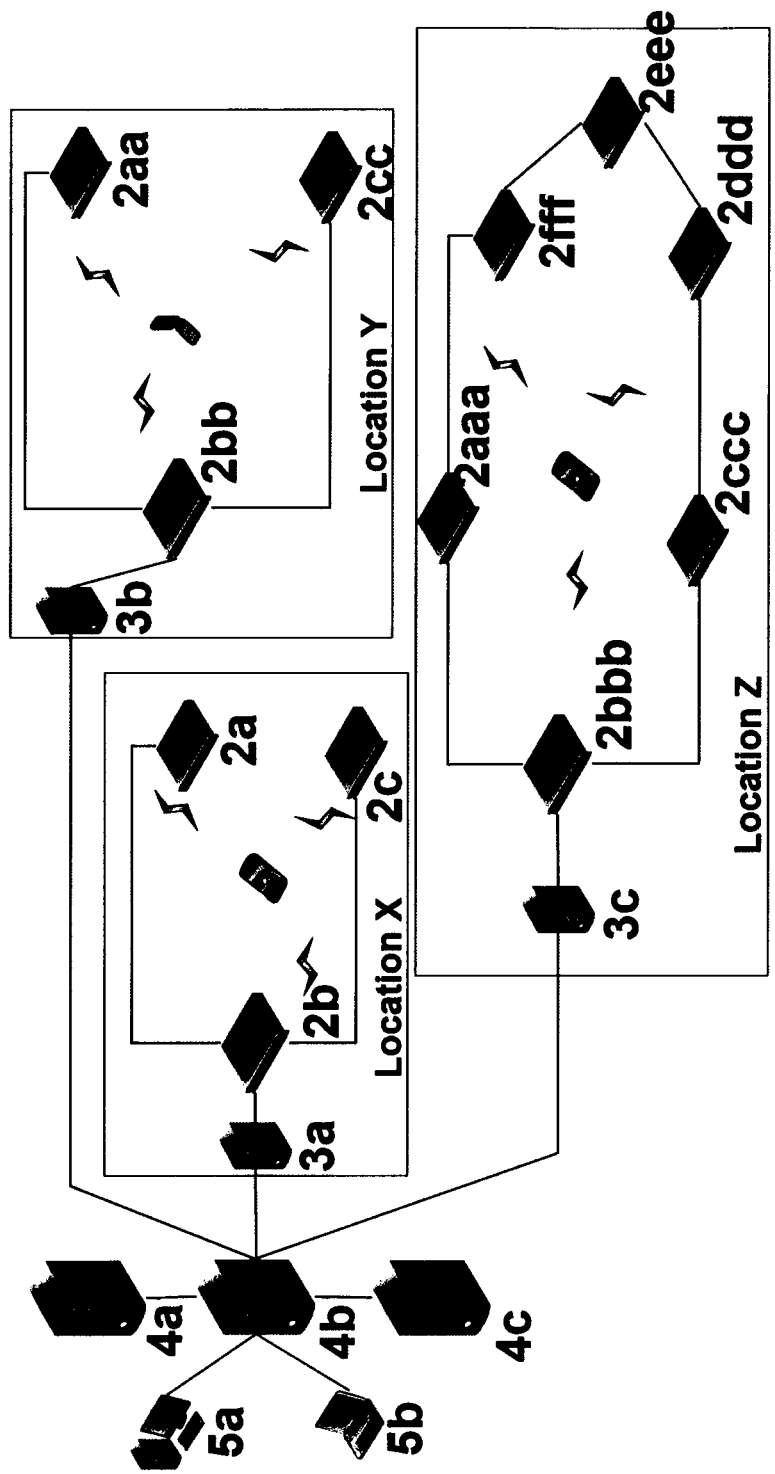
FIG. 4): Schematic diagram of the proposed system using more than one main server and covering more than one location, in this example covering three locations geographically scattered and connected via high-speed network.

In the case of a multiple location deployment, as demonstrated in FIG. 4, the systems has the same behaviour as described above. The only difference is that the data is aggregated from the diverse sources (local servers). The aggregated data is processed by the main server that can cross reference location data received from the different sources.

In the unlikely event of an network disruption all the intervenients in the system act as a buffer (besides the main server). When the network establishes again a connection to the main server and between nodes, all buffered data is sent in batches that are processed in a first in first out order of events.

The invention claimed is:

1. A system for determining position of devices in a network in real time, the system comprising:

one or more detecting nodes to (i) detect signal strength of radio frequency signals emitted by one or more devices, (ii) retrieve a unique identifier from each of the one or more devices, and (iii) communicate calibration packets to other detecting nodes at predetermined periodic intervals, the one or more detecting nodes storing together the signal strength, unique identifier and calibration packets as location determining data;

a local server connected to each of the one or more detecting nodes, to (a) receive the location determining data including the calibration packets from said each of the one or more detecting nodes and generate a timestamp for the received location determining data including the calibration packets, and (b) determine, for each of the one or more devices, location information by calculating a distance of each of the one or more devices relative to said each of the one or more detecting nodes based on the received location determining data including the calibration packets; and a main server to perform analysis on the location information and the data received by the local server from each of the one or more devices.

2. The system according to claim 1, further comprising: another local server that is connected to the main server; and one or more additional detecting nodes, wherein said another local server and the one or more additional detecting nodes are connected in a network that is separated from the network including the one or more device and the local server.

3. The system according to claim 1, wherein the calibration packets are communicated as Wi-Fi packets at predetermined periodic intervals.

4. The system according to claim 1, wherein the retrieved unique identifier corresponding to each of the one or more devices is a MAC address.

5. The system according to claim 2, wherein the calibration packets are communicated as Wi-Fi packets at predetermined periodic intervals.

6. The system according to claim 2, wherein the retrieved unique identifier corresponding to each of the one or more devices is a MAC address.

7. The system according to claim 3, wherein the retrieved unique identifier corresponding to each of the one or more devices is a MAC address.

* * * * *